United States Patent
Bennett

(10) Patent No.: US 6,581,878 B1
(45) Date of Patent: Jun. 24, 2003

(54) AIRBORNE FIRE FIGHTING SYSTEM

(75) Inventor: Joseph M. Bennett, Huber Heights, OH (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 0 days.

(21) Appl. No.: 09/945,609

(22) Filed: Sep. 4, 2001

Related U.S. Application Data

(60) Provisional application No. 60/284,743, filed on Apr. 17, 2001.

(51) Int. Cl.[7] .................................................. B64D 1/16
(52) U.S. Cl. ......................... 244/136; 169/53; 239/171
(58) Field of Search .......................... 244/136; 169/28, 169/53; 239/171

(56) References Cited

U.S. PATENT DOCUMENTS

| | | | |
|---|---|---|---|
| 4,195,693 A | * | 4/1980 | Busch et al. .................. 169/53 |
| 4,619,640 A | * | 10/1986 | Potolsky et al. ............ 128/912 |
| 5,291,952 A | * | 3/1994 | Arend .......................... 169/71 |
| 5,326,053 A | * | 7/1994 | Pahl et al. ..................... 169/53 |
| 5,423,384 A | * | 6/1995 | Galbraith et al. .............. 149/21 |
| 5,449,041 A | * | 9/1995 | Galbraith .................... 102/290 |
| 5,465,795 A | * | 11/1995 | Galbraith et al. ............. 169/11 |
| 5,609,210 A | * | 3/1997 | Galbraith et al. ............. 169/26 |
| 5,992,528 A | * | 11/1999 | Parkinson et al. ............ 169/26 |

FOREIGN PATENT DOCUMENTS

| | | | | |
|---|---|---|---|---|
| FR | | 2617404 A1 | * 1/1989 | ............ A62C/3/02 |

* cited by examiner

*Primary Examiner*—Robert P. Swiatek
*Assistant Examiner*—Kevin Jakel
(74) *Attorney, Agent, or Firm*—Bobby D. Scearce; Thomas L. Kundert

(57) ABSTRACT

System and method for pressurizing and dispersing fire retardant from an aircraft, particularly aircraft structured and equipped for retarding or extinguishing forest fires, that includes a small power pack having a plenum operatively interconnecting a plurality of individual solid propellant gas generator devices each containing solid propellant materials that react pyrotechnically when initiated electrically to generate large quantities of high-pressure gas in a few seconds for discharging a liquid retardant reservoir.

5 Claims, 2 Drawing Sheets

US 6,581,878 B1

AIRBORNE FIRE FIGHTING SYSTEM

CROSS-REFERENCE TO RELATED APPLICATION

This application claims priority of the filing date of Provisional Application Serial No. 60/284,743 filed Apr. 17, 2001, the entire contents of which are incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to airborne fire fighting systems and methods, and more particularly to an improved system and method for pressurizing and dispersing fire retardant from an aircraft equipped for retarding or extinguishing forest fires.

Aircraft such as the C-130 presently used for fire fighting by agencies such as the U.S. Forest Service are outfitted with liquid fire retardant dispersal systems including a liquid retardant reservoir, compressed air tanks, air compressor, discharge tube and nozzles, and related equipment all mounted on movable pallets. The systems are designed to perform multiple individual discharges each of several hundred gallons over a 4 to 5 second period, in a single flight, or to discharge the entire contents in a single burst. The systems are generally large and heavy, have power requirements that severely tax the available power supply aboard an aircraft, and potential electromagnetic interference (EMI) from the equipment that can be disruptive to the aircraft avionics.

The invention solves or substantially reduces in critical importance problems with previously existing aircraft based fire retardant dispersal systems by providing a system including a small light weight power pack having a plenum operatively connecting a plurality of individual solid propellant gas generator devices each containing solid propellant materials that react pyrotechnically when initiated electrically to generate large quantities of high-pressure gas in a few seconds for providing the force required to discharge the liquid fire retardant from a reservoir. The gas generator devices require negligible power to kick start and do not produce significant EMI. The invention may be applied to substantially any system for pressurizing and dispersing fire retardant from an airborne fire fighting aircraft currently used or contemplated for use. The space and weight savings afforded by use of the invention over conventional systems are substantial (about 800 lbs to 50 lbs weight reduction and about 36 cubic feet to about 1 cubic foot). The gas generator devices are sufficiently inexpensive as to afford replacement after each flight.

It is therefore a principal object of the invention to provide an improved system for retarding or extinguishing ground fires such as forest fires.

It is another principal object of the invention to provide an improved airborne fire fighting system.

It is another object of the invention provide an improved airborne fire fighting system for pressurizing and dispersing liquid fire retardant from substantially any type of aircraft.

It is a further object of the invention to provide a lightweight airborne fire fighting system having small size and improved operational characteristics.

These and other objects of the invention will become apparent as a detailed description of representative embodiments proceeds.

SUMMARY OF THE INVENTION

In accordance with the foregoing principles and objects of the invention, system and method are provided for pressurizing and dispersing fire retardant from an aircraft, particularly aircraft structured and equipped for retarding or extinguishing forest fires, that includes a small power pack having a plenum operatively interconnecting a plurality of individual solid propellant gas generator devices each containing solid propellant materials that react pyrotechnically when initiated electrically to generate large quantities of high-pressure gas in a few seconds for discharging a liquid retardant reservoir.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
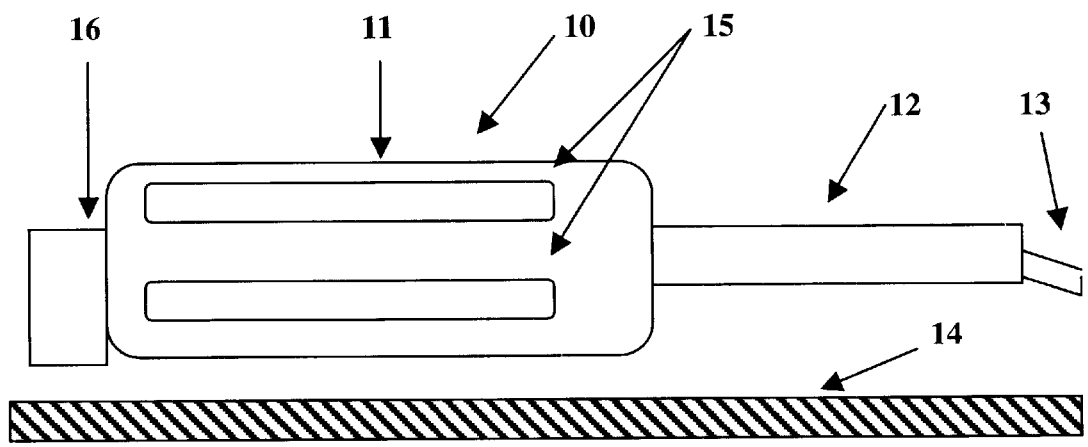
FIG. 1 is a schematic side elevational view of a typical airborne fire fighting system to which the invention may be applied.

A schematic layout of a typical previously existing airborne fire fighting system 10 to which the invention may be applied is shown in FIG. 1. System 10 generally includes a liquid retardant reservoir 11, nozzle manifold 12 and discharge nozzle 13 mounted on a large palletized platform 14. In a typical system, as much as about 4000 gallons of liquid fire retardant may be stored in reservoir 11 for airborne dispersal. The retardant is typically dispersed in one burst or a few (usually about six) individual bursts of several hundred gallons each. The liquid retardant in each burst must be discharged within about five seconds through nozzle 13 and out through an opened rear cargo bay door of the aircraft (not shown) in flight. In order to provide sufficient force to discharge the retardant through nozzle 13, a small number (usually about four) compressed air tanks 15 are disposed near and operatively connected to reservoir 11. In the FIG. 1 system 10, each tank 15 is typically about 12 feet in length and one foot in diameter, about 200 pounds in weight, and pressurized to about 100 psi by a high performance air compressor 16 mounted on platform 14. Compressor 16 is typically a 100-hp unit about 6×3×2 feet in size and weighing about 400 lbs. Additional support equipment for system 10 not relevant to the improvements described herein are not shown in FIG. 1.

Figure 2:
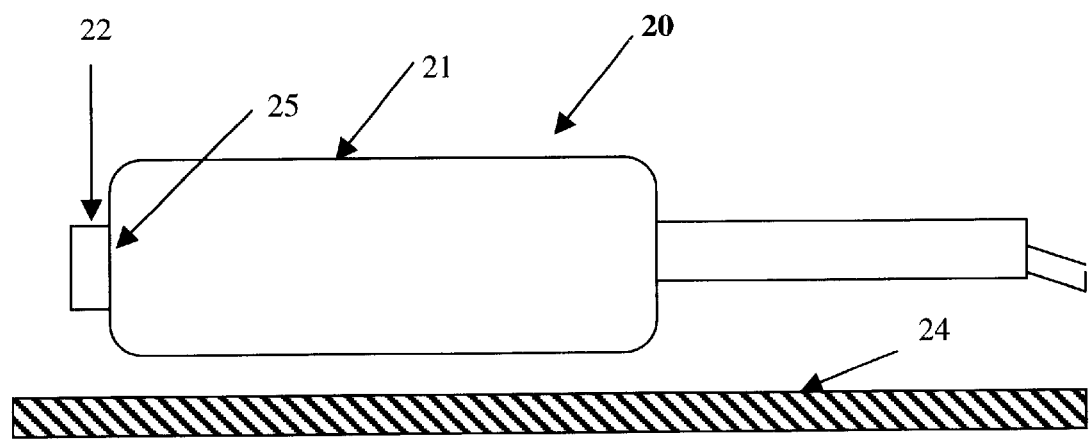
FIG. 2 is a schematic side elevational view of an improved discharge and pressurization system in a representative embodiment of the invention.
Figure 3:
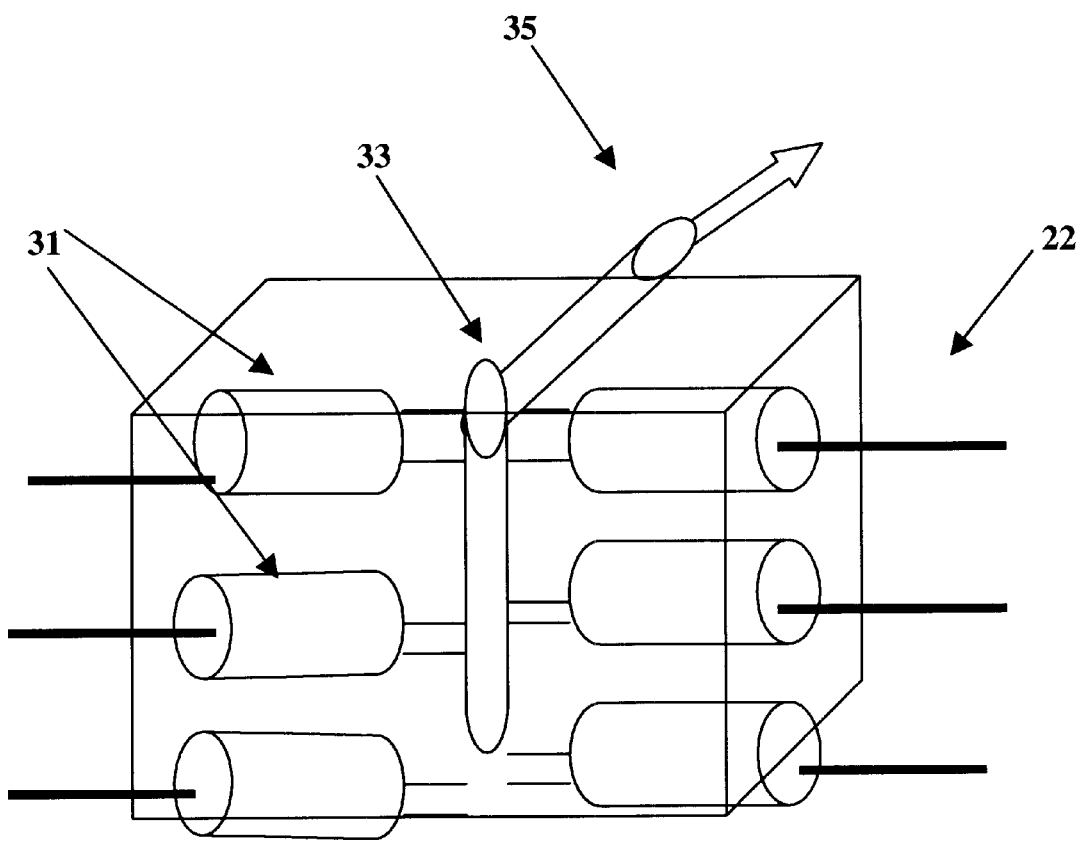
FIG. 3 shows a schematic perspective view of the power pack layout of the representative embodiment of the invention depicted in FIG. 2.

FIG. 2 is a schematic elevational view of an improved liquid retardant pressurization and discharge system 20 in a representative embodiment of the invention. FIG. 3 shows a schematic perspective view of the power pack used for liquid retardant pressurization and dispersal in system 20. In system 20, liquid retardant may be disposed within reservoir 21 of size and configuration substantially the same as reservoir 11 of system 10 (FIG. 1), and the entire system 20 may be mounted on platform 24 as in system 10. Representative liquid fire retardant materials useful in the practice of the invention include aqueous slurries and solutions containing ammonium phosphate, ammonium sulfate or ammonium polyphosphate, possibly used with thickening agents such as attapulgite clay, guar gum or others as would occur to the skilled artisan practicing the invention, the specific material selection not considered limiting of the teachings herein or of the appended claims. In accordance with a principal feature of the invention, power pack 22, described more fully below in relation to FIG. 3, is operatively connected to reservoir 21 for providing the pressurized gas to propel the liquid fire retardant. Power pack 22 is small and compact and can therefore be placed substantially anywhere on platform 24, and may be operatively connected to reservoir 21 through a high pressure manifold conduit, hose 25 or like connections as with the compressed air tanks of system 10 (FIG. 1). As discussed in more detail below, the specific plenum configuration and internal cartridge selection and placement for a particular application may be selected by the skilled artisan guided by these teachings in order to minimize space, optimize flow patterns, and otherwise to provide efficient transfer of pressurized gas for liquid retardant discharge.

Referring now specifically to FIG. 3, power pack 22 includes multiple solid-propellant gas generator cartridges 31 to provide propulsive pressurization gas for the liquid retardant. Cartridges 31 are connected to plenum 33 that directs the flow from each cartridge 31 to a central tube 35 operatively attached to the retardant reservoir (21 of FIG. 2). A single cartridge 31 may be used for a partial discharge of the retardant contents of reservoir 21, or two or more of the cartridges may be used simultaneously to effect discharge of greater amounts or all the contents of reservoir 21. In the embodiment depicted in FIG. 3, power pack 22 is described as including six gas generator cartridges 31. It is noted, however, that any number and individual sizes of cartridges 31 may be used in a particular application within the contemplated scope of these teachings and the appended claims, six cartridges being a convenient number considering the usual capacity (about 4000 gallons) of a liquid retardant reservoir aboard an aircraft and the useful discharge amount (about 600 gallons) for multiple individual partial discharges of the reservoir contents.

Alternatively, bundled individual plenums could be attached to each cartridge. Assuming the required plenums and surrounding power pack housings require relatively little additional space in addition to the cartridges, overall power pack 22 dimensions of about 21×21×8 inches may result. The cartridges have a small electrical power wire to the squib in the end of each cartridge. Each discharged cartridge can be detached and replaced by another cartridge when the aircraft returns after a retardant discharge sortie, while the retardant reservoir is being re-filled and the aircraft re-fueled.

Cartridges 31 used in the practice of the invention may be variants of the cartridges used to provide virtually instantaneous gas generation and discharge for inflating automotive airbags, aircraft escape slides, parachutes for dropped munitions, or the like, or for discharging extinguishant in fire protection systems. These devices comprise an internal arrangement of solid-propellant pyrotechnic materials that are shaped in small tablet form and stacked in predetermined arrangements and stored in a simple housing in most embodiments. Typical pyrotechnic materials useful in the practice of the invention include sodium azide, ammonium nitrate, guanidine nitrate, cellulose acetate, strontium nitrate, 5-aminotetrazole or nitroguanidine, or other like materials as would occur to the skilled artisan, specific material selection not considered limiting hereof or of the appended claims. When jump-started by a small electrical stimulus, they react exothermally to decompose and generate copious amounts of high-pressure gases, such as nitrogen and carbon dioxide, as byproducts of reaction. Of these many variants, numerous devices that provide the size, gas output amount, discharge duration and pressurization profile desired for any application can be obtained.

Many commercially available or specially customized gas generator devices may be used in the practice of the invention. The device specified by the Air Force under MIL-C-27505B as an MXU-4A/A engine starter cartridge is a representative preferred device. Commercially available cartridges have been used previously for starting B-52, KC-135, F-4, and F-111 aircraft engines, as opposed to traditional start cart ground support equipment, by providing the gust of gas to begin the turning of the turbine. The devices weigh about 8 lbs each, are about 8.58 inches long and 6.48 inches in diameter, require about 1 to 2 volts to discharge, exhibit discharge times of the order of a few seconds (adjustable by selectively sizing the outer housing discharge opening), and may be capable of moving 600 gallons of liquid in 5 seconds. This power requirement is not only much less than currently required (which can be currently prohibitive for some aircraft), but produces negligible electromagnetic interference (EMI) to harm aircraft avionics when functioning, due to its predominant reliance on propellant chemical energy for pressurization force.

The system of the invention dramatically reduces both the weight and size of the equipment required to pressurize and discharge the liquid retardant, such as in the elimination of the need for compressed air tanks, the associated compressor and support equipment and the excessive power requirements on the aircraft in conventional systems. Additionally, the system of the invention is relatively inexpensive in that the cartridges used in the power pack of the invention are more reliable than conventionally used electromechanical equipment and may be easily and economically replaced after each fire fighting flight.

The invention therefore provides an improved airborne fire fighting system. It is understood that modifications to the invention may be made as might occur to one with skill in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

I claim:

1. A system for pressurizing and dispersing fire retardant from an aircraft, comprising:

(a) a substantially closed reservoir for containing liquid, said reservoir having an inlet and an outlet;

(b) a source of liquid fire retardant disposed within said reservoir;

(c) a high pressure-manifold operatively connected to said inlet of said reservoir;

(d) a power pack operatively connected to said manifold and communicating therethrough with said inlet of said reservoir, said power pack including a plurality of solid propellant gas generator cartridges each containing solid propellant material that reacts pyrotechnically for generating propulsive pressurization gas for selectively discharging said liquid retardant from said outlet of said reservoir; and (e) a movable platform for supporting the system.

2. The system of claim 1 further comprising electrical means for selectively initiating one or more of said cartridges.

3. The system of claim 1 wherein said fire retardant comprises a material selected from the group consisting of ammonium phosphate, ammonium sulfate and ammonium polyphosphate.

4. The system of claim 1 wherein said reservoir has a capacity of about 4000 gallons.

5. The system of claim 1 wherein said propellant material is selected from the group consisting of sodium azide, ammonium nitrate, guanidine nitrate, cellulose acetate, strontium nitrate, 5-aminotetrazole and nitroguanidine.

* * * * *